United States Patent Office 3,159,677
Patented Dec. 1, 1964

3,159,677
FLUORENAMINES AND PROCESS FOR
PREPARATION THEREOF
Erik F. Godefroi, Detroit, Mich., assignor to Parke,
Davis & Company, Detroit, Mich., a corporation of
Michigan
No Drawing. Filed Apr. 12, 1960, Ser. No. 21,578
14 Claims. (Cl. 260—576)

The present invention is concerned with 1,2,3,4,4a,9a-hexahydro-4a-fluorenamines, with 1,4,4a,9a-tetrahydro-4a-fluorenamines; with 5a,6,7,8,9,9a-hexahydro-9a-dibenzofuranamines, with 5a,6,9,9a-tetrahydro-9a-dibenzofuran-amines, with substituted derivatives of the foregoing compounds, with acid-addition salts thereof and with methods for their production.

The novel compounds of this invention can be represented as their free bases by the structural formula

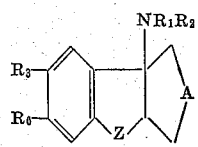

In this formula, $R_1$ represents hydrogen, a lower alkyl radical, a lower alkoxyalkyl radical or the benzyl radical; $R_2$ represents hydrogen or a lower alkyl radical; $R_3$ and $R_4$ each represent hydrogen or in combination represent the methylenedioxy radical; A represents the ethylene (—$CH_2CH_2$—) or the vinylene (—CH=CH—) radical; and Z represents oxygen or the methylene radical. When either $R_1$ or $R_2$ is a lower alkyl radical, it is selected from among alkyl radicals containing not more than 6 carbon atoms and is preferably methyl or ethyl. When $R_1$ is a lower alkoxyalkyl radical, it is selected from among alkoxyalkyl radicals containing not more than 6 carbon atoms and is preferably an alkoxyethyl or an alkoxypropyl radical.

The free bases of the foregoing formula form acid-addition salts with a variety of pharmaceutically-acceptable inorganic and organic acids. Non-toxic salts are formed by the reaction of the free bases with such pharmaceutically-acceptable acids as hydrochloric, hydrobromic, hydriodic, sulfuric, acetic, benzoic, citric, maleic, malic, gluconic, ascorbic and related acids. The term "pharmaceutically-acceptable acid" designates an acid capable of being employed in the production of salts suitable for pharmaceutical use, even though, as in the case of a corrosive or strong mineral acid, it may not be acceptable for pharmaceutical use in and of itself. The expression "salts with pharmaceutically-acceptable acids" refers to chemical structure rather than to method of formation and includes such salts whether formed by neutralization or other salt-forming means. The salt formation is suitably carried out by reacting the selected base with the selected acid in an unreactive solvent. The acid-addition salts can be converted to the free bases by reaction with a base such as sodium hydroxide or potassium hydroxide. In the applications of this invention, the compounds can be employed either as free bases or in the form of acid-addition salts. The acid addition salts are preferred where greater water solubility is desired.

In one of the methods for the production of compounds of this invention, a compound of the formula

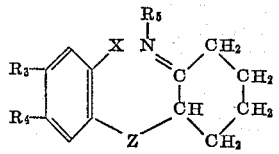

wherein X represents halogen, preferably bromine or iodine, $R_5$ represents a lower alkyl, a lower alkoxyalkyl, or a benzyl radical, and $R_3$, $R_4$ and Z are as defined before, is reacted with a reactive organometallic compound capable of causing halogen-metal interchange and subsequent ring closure. The preferred organometallic compound is butyllithium although other lithium derivatives such as phenyllithium and propyllithium as well as organometallic derivatives of alkali metals and alkaline earth metals such as sodium, potassium and magnesium can also be used, generally with somewhat poorer results. The initial phase of the reaction is carried out under anhydrous conditions in a non-hydroxylic solvent such as an ether or a hydrocarbon, at a temperature below 0° C. and preferably in the range of —40° to —80° C. in the case of butyllithium. Under these conditions, substitution of the halogen atom by the metal occurs. The reaction is completed by warming the mixture above 0° C., preferably to room temperature or to the reflux temperature of the solvent, and treating the mixture with water or an aqueous medium to hydrolyze the organometallic derivative resulting from ring closure. The product obtained in this manner is the secondary amine of the formula

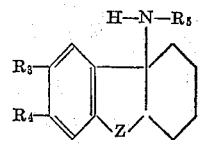

where $R_3$, $R_4$, $R_5$ and Z are as defined before.

N-substituted-2-(o-halobenzyl)cyclohexanimines of the formula

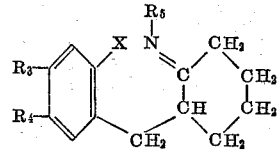

where $R_3$, $R_4$, $R_5$ and X are as defined before, which are employed as starting materials in the practice of this invention, can be prepared by the reaction sequence which comprise reacting an o-halobenzyl halide with cyclohexanone in the presence of sodamide followed by reacting the resulting 2-(o-halobenzyl)-cyclohexanone of the formula

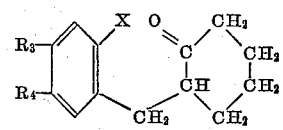

where $R_3$, $R_4$ and X are as defined before, with a primary amine. o-Halobenzyl halides are obtainable from o-halobenzoic acids by reduction with lithium aluminum hydride and treatment of the product with a thionyl halide, or by the application of other methods known in the art.

A method analogous to those indicated above can be used for the preparation of N-substituted-2-(o-halophenoxy) cyclohexanimines of the formula

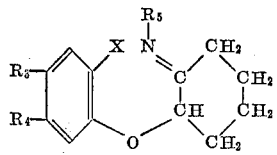

where $R_3$, $R_4$, $R_5$ and X are as defined before, which are used as starting materials in the practice of this invention. In this case, 2-(o-halophenoxy)cyclohexanones of the formula

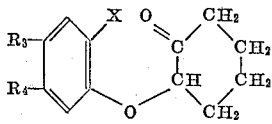

where $R_3$, $R_4$ and X are as defined before, can be prepared by the reaction of the sodium salt of an o-halophenol with a 2-halocyclohexanone. Reaction of the resulting ketone with a primary amine then yields the imine useful as a starting material.

In the preparation of the various classes of imines employed as starting materials, it is not necessary and usually not desirable that they be purified prior to use. It is satisfactory to conduct the reaction of the ketone with the selected primary amine and to determine the purity of the resulting crude imine by infrared absorption. The progress of the reaction of the ketone with the primary amine is indicated by the disappearance of ketone absorption at about 5.8 microns and the appearance of imine absorption at about 6.07 microns. A product exhibiting strong absorption in the region of 6.07 microns and only weak residual absorption in the range of 5.8 microns characterizes an imine suitable for use as a starting material in the practice of the invention.

In another method for the production of compounds of this invention a urethane or alkyl carbamate of the formula

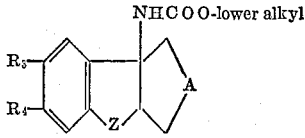

where $R_3$, $R_4$, Z and A are as defined before and the lower alkyl radical is an alkyl radical containing not more than 6 carbon atoms, preferably methyl or ethyl, is reduced to convert the carbamate group to a monomethylamino group. The reduction can be carried out by treating the alkyl carbamate in an unreactive medium such as an anhydrous ether or an anhydrous hydrocarbon with a complex metal hydride such as lithium aluminum hydride followed by decomposing the product with an aqueous medium, preferably an aqueous solution of an alkali metal hydroxide. At least the calculated amount, and preferably an excess, of the reducing agent is used. The reaction with the complex metal hydride is usually conducted at a temperature between 20° and 100° C., although satisfactory results are also obtained somewhat outside of this range. The product obtained has the formula

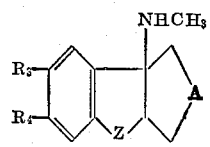

where $R_3$, $R_4$, Z and A are as defined before.

Alkyl esters of 1,4,4a,9a-tetrahydro-4a-fluorenecarbamate and of 5a,6,9,9a-tetrahydro-9a-dibenzofurancarbamate used as starting materials in the practice of the invention can be obtained by esterifying indene-3-carboxylic acid or benzofuran-3-carboxylic acid to a corresponding alkyl ester, reacting the alkyl ester with butadiene to obtain an alkyl ester of 1,4,4a,9a-tetrahydro-4a-fluorenecarboxylic acid or an alkyl ester of 5a,6,9,9a-tetrahydro-9a-dibenzofurancarboxylic acid, hydrolyzing to the corresponding free acid, converting the acid to the amide by reaction with thionyl chloride and then with ammonia, followed by reacting the amide with bromine and sodium alkoxide in a lower alkanol to produce (via the isocyanate) the desired alkyl carbamate. Appropriate substitution products of the parent ring systems can also be used in this reaction sequence.

Alkyl esters of 1,2,3,4,4a,9a-hexahydro - 4a - fluorenecarbamate and of 5a,6,7,8,9,9a - hexahydro - 9a - dibenzofurancarbamate used as starting materials in the practice of the invention can be obtained by hydrogenating an alkyl ester of 1,4,4a,9a-tetrahydro - 4a - fluorenecarboxylic acid or an alkyl ester of 5a,6,9,9a-tetrahydro-9a-dibenzofurancarboxylic acid, hydrolying to the corresponding free acid, converting the acid to the amide by reaction with thionyl chloride and then with ammonia, followed by reacting the amide with bromine and sodium alkoxide in a lower alkanol to produce (via the isocyanate) the desired alkyl carbamate. Appropriate substitution products of the parent ring systems can also be used in this reaction sequence.

In a further method for the production of compounds of this invention, primary amines are obtained by hydrolyzing urethanes or alkyl carbamates of the formula

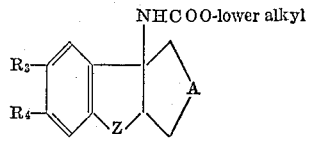

where $R_3$, $R_4$ Z and A are as defined before and the lower alkyl radical is an alkyl radical containing not more than 6 carbon atoms, preferably methyl or ethyl. The conversion to the primary amine is carried out by vigorous basic hydrolysis. Examples of suitable reaction media are sodium hydroxide or potassium hydroxide in diethylene glycol containing a small amount of water. Other strong bases and high boiling hydroxylic solvents can be used and the reaction can also be carried out using a low boiling medium such as potassium hydroxide in aqueous ethanol by conducting the reaction under pressure. The reaction is preferably carried out by heating the mixture at from 120° to 250° C. until the hydrolysis is substantially complete. With potassium hydroxide in refluxing diethylene glycol, the reaction is substantially complete within 12–18 hours. The product obtained has the formula

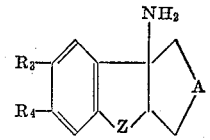

where $R_3$, $R_4$, Z and A are as defined before.

In still another method for the production of compounds of this invention primary amines are obtained by subjecting secondary amines or acid-addition salts thereof having in free base form the formula

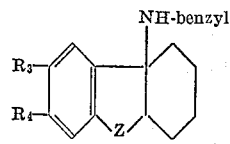

to catalytic hydrogenation, where $R_3$, $R_4$, and Z are as defined before. The hydrogenation can be carried out under atmospheric or greater than atmospheric pressure, in unreactive solvents with a noble metal catalyst such as palladium on charcoal. Primary amines so obtained have in free base form the formula

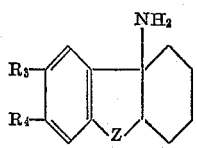

where $R_3$, $R_4$ and Z are as defined before. The monobenzylamino compounds employed as starting materials can be obtained by the reaction of an N-benzyl-2-(o-halobenzyl)-cyclohexanimine or an N-benzyl-2-(o-halophenoxy)cyclohexanimine with butyllithium in ether followed by hydrolysis of the product with water, or by other general methods known in the art.

In a further method of production of compounds of this invention, secondary and tertiary amines having in free base form the formula

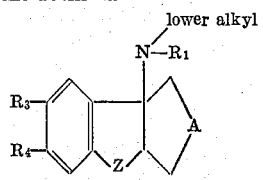

are produced by the alkylation of primary and secondary amines having in free base form the formula

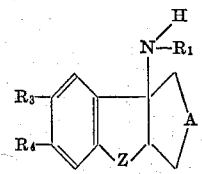

wherein $R_1$, $R_3$, $R_4$, Z and A are as defined before. The alkylation can be carried out directly by reaction with an alkylating agent such as an alkyl halide or sulfate. Methylation can be accomplished by reaction with a mixture of formaldehyde and formic acid. The alkylation can also be carried out in a step-wise fashion by first acylating the amine with an acylating agent such as a carboxylic acid anhydride or halide followed by reducing the carbonyl group in the resulting amido compound. The reduction is preferably carried out by reaction with lithium aluminum hydride in a nonhydroxylic medium, preferably an ether or a hydrocarbon, followed by decomposition of the product with an aqueous medium. The alkylation to monoalkylamino compounds can also be achieved by reductive alkylation of the primary amino compounds. Such a reductive alkylation can be carried out by reacting the primary amino compound with an aldehyde or ketone and subjecting the reaction mixture to catalytic hydrogenation.

In still a further method for the production of compounds of this inventoin, 1,2,3,4,4a,9a-hexahydro-4a-fluorenamines and 5a,6,7,8,9,9a-hexahydro-9a-dibenzofuranamines or acid-addition salts thereof are obtained by the catalytic hydrogenation of 1,4,4a,9a-tetrahydro-4a-fluorenamines and 5a,6,9,9a-tetrahydro-9a-dibenzofuranamines or acid-addition salts thereof which have in free base form the formula

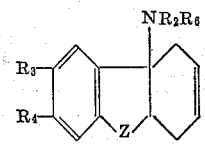

where $R_2$, $R_3$, $R_4$ and Z are as defined before, and $R_6$ represents hydrogen or a lower alkyl radical. The hydrogenation can be carried out under atmospheric or greater than atomspheric pressure in unreactive solvents with a noble metal catalyst such as palladium on charcoal. In the forms of their free bases the products so obtained have the formula

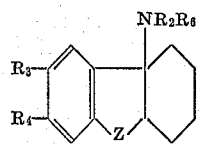

where $R_2$, $R_3$, $R_4$, $R_6$ and Z are as defined before.

The compounds of this invention are useful pharmacological agents. They are central nervous system depressants which exhibit a variety of effects. At low dosages, they produce euphoria and at somewhat higher dosages they exhibit anticonvulsant and cataleptoid properties. They are also useful in the treatment of states of hyper-excitability and in the production of anesthesia. In combination with barbiturates they enhance the anesthetic effect of the latter compounds with a lessening of respiratory depression. The compounds of the invention are orally active and exhibit their useful depressant activities upon either oral or parenteral administration. Where a short duration of action is desired the 1,4,4a,9a-tetrahydro-4a-fluorenamine compounds are preferred.

The present application is a continuation-in-part of copending application Serial No. 811,018, filed May 5, 1959, now abandoned.

The invention is illustrated, but not limited, by the following examples:

Example 1

To an ethereal solution of butyllithium prepared from 26 ml. of butyl bromide and 3.6 g. of lithium in 200 ml. of ether and chilled to −70° C. is added a solution of 36.4 g. of N-methyl-2-(o-bromobenzyl)-cyclohexanimine in a small volume of ether. The temperature rises to about −45° C. The mixture is again chilled to −70° C. and stirred for 45 minutes during which time the temperature rises to about −55° C. With continuous stirring, 200 ml. of ether is added and the mixture is allowed to warm to room temperature. The mixture is then treated cautiously with water and, after thorough mixing, separated into aqueous and non-aqueous phases. The separated organic phase is combined with an ether extract of the aqueous phase, washed with a small quantity of water and evaporated to dryness. The residue is diluted with an equal volume of ether and extracted with three portions of 3-normal hydrochloric acid. An additional extraction is made with a quantity of 9-normal hydrochloric acid. The combined aqueous acidic extracts are made basic with 5-normal sodium hydroxide solution, causing the separation of the organic free base. This free base is removed by extraction with three portions of ether. The ether extract is rendered anhydrous with magnesium sulfate and evaporated to afford a residue of N-methyl-1,2,3,4,4a,9a-hexahydro-4a-fluorenamine. The hydrochloride is obtained by treating an ethereal solution of this free base with a slight excess of hydrogen chloride in isopropyl alcohol; M.P. after crystallization from a mixture of methanol and ether about 201–203° C. The hydrobromide is obtained by treating an ethereal solution of the free base with a slight excess of hydrogen bromide in isopropyl alcohol.

Example 2

To an ethereal solution of butyllithium prepared from 26 ml. of butyl bromide and 3.6 g. of lithium in 200 ml. of ether, and chilled to −65° C., is gradually added 35 g. of N-ethyl-2-(o-bromobenzyl)cyclohexanimine. Anhydrous ether (250 ml.) is added and the mixture is allowed to warm to room temperature. It is stirred for 2 hours at room temperature and then decomposed by the cautious addition in small portions of 150 ml. of water. The separated organic phase is washed with water and the ether is removed by evaporation. The residue is mixed with a 50 ml. portion of fresh ether and extracted twice with 3-normal hydrochloric acid. The combined aqueous acidic extracts are made distinctly basic and extracted with ether. The dried ethereal extract is evaporated to yield a residue of N-ethyl-1,2,3,4,4a,9a-hexahydro-4a-fluorenamine. The hydrochloride is obtained by treating an ethereal solution of this free base with a slight excess of hydrogen chloride in isopropyl alcohol. After recrystallization from a mixture of methanol and ether, the hydrochloride melts at about 198–199° C. A water-soluble citrate is obtained by mixing a solution of the free base in methanol with a solution of citric acid in methanol and concentrating the mixture to a small volume.

Example 3

A solution of 12.8 g. of butyllithium in 200 ml. of ether is chilled to −70° C. following which there is added all at once a solution of 30.8 g. of N-propyl-2-(o-bromobenzyl)cyclohexanimine in 30 ml. of ether. Following the addition, the mixture is again chilled to −70° C. and stirred at that temperature for 30 minutes. The mixture is then diluted with 200 ml. of ether, allowed to come to room temperature and stirred for an additional 40 minutes. It is then decomposed by the cautious addition of water, care being taken to ensure complete reaction of the excess lithium. The separated organic phase is combined with an ether extract of the aqueous phase, washed with water and distilled under reduced pressure until the ether is removed. A solution of the residue in 50 ml. of ether is extracted with three 50 ml. portions of 3-normal hydrochloric acid. The combined acidic extract is made basic with 5-normal sodium hydroxide solution and the liberated organic base is removed by extraction with several portions of ether. The combined ethereal extract is washed with a small amount of water, dried over magnesium sulfate, filtered and evaporated to dryness to yield a residue of N-proypl-1,2,3,4,4a,9a-hexahydro-4a-fluorenamine. An ethereal solution of the free base is treated with a slight excess of hydrogen chloride in isopropyl alcohol and the product is purified by recrystallization from mixtures of methanol and ether. This is the hydrochloride, M.P. about 229–230° C.

Example 4

A solution of butyllithium is prepared by mixing a solution of 3.6 g. of lithium in 175 ml. of ether with a solution of 26 ml. of butyl bromide in 25 ml. of ether and stirring the reaction mixture between −10° C. and +10° C. for 1 hour or until the reaction is complete. This ethereal solution is then chilled to −70° C. and treated all at once with 25.2 g. of N-pentyl-2-(o-bromobenzyl)cyclohexanimine diluted with 25 ml. of ether. A temperature rise to about −43° C. is observed. With continuous stirring, the mixture is again chilled to −70° C. and maintained at this temperature for 10 minutes following which it is diluted with 200 ml. of ether, and allowed to warm to room temperature. The reaction mixture is then decomposed by the cautious addition of water. The organic phase combined with an ether extract of the aqueous phase is washed with water and concentrated under reduced pressure until the ether is removed. A solution of the residue in a small volume of ether is stirred with a 50 ml. portion of 3-normal hydrochloric acid and the N-pentyl-1,2,3,4,4a,9a-hexahydro-4a - fluorenamine hydrochloride insoluble in either phase is collected by filtration. Recrystallization from a mixture of methanol and ether affords the purified product, M.P. about 203–205° C. The corresponding free base is obtained by treating an aqueous solution of the hydrochloride with sodium hydroxide and extracting with ether.

Example 5

A solution of butyllithium prepared from 1.3 g. of lithium and 9 ml. of butyl bromide in 70 ml. of anhydrous ether is diluted with 400 ml. of anhydrous ether below 0° C. and then chilled to −65° C. To this is rapidly added 24.2 g. of N-(3-methoxypropyl)-2-(o-bromobenzyl)cyclohexanimine. The temperature rises slightly. The mixture is stirred for 15 minutes at between −55° and −70° C. and then allowed to warm slowly to room temperature and stand for 2 hours. The mixture is decomposed by the cautious addition of water, and the organic phase is concentrated until only about 50 ml. of ether remains. This ethereal solution is extracted with several portions of dilute hydrochloric acid. The combined aqueous acidic extract is made distinctly basic and extracted with ether. This ether extract is dried and evaporated to yield a residue of N-(3-methoxypropyl)-1,2,3,4,4a,9a-hexahydro-4a-fluorenamine. An ether solution of this free base is treated with approximately one equivalent of hydrogen chloride in isopropyl alcohol, and the hygroscopic crude hydrochloride is washed with a minimum quantity of methanol or methanol plus ether and then crystallized from a mixture of methanol and ether; M.P. about 203–204° C.

Example 6

An ethereal solution of butyllithium prepared from 2.7 g. of lithium, 19 ml. of butyl bromide and 150 ml. of ether is cooled to −65° C. To this solution is added 55 g. of N-benzyl-2-(o-bromobenzyl)cyclohexanimine following which the mixture is maintained at −65° C. for 30 minutes. An additional 150 ml. of ether is added and the solution is then allowed to warm to room temperature and stand overnight. The mixture is cautiously treated with a total of 200 ml. of water and the separated organic phase is washed with water and concentrated under reduced pressure until the ether is removed. A solution of the residue in a 100 ml. portion of fresh ether is extracted with several portions of 3-normal hydrochloric acid. The separated aqueous solution is made distinctly basic and extracted with ether. This organic extract is dried and evaporated. The residue is submitted to distillation in a vacuum, a fraction boiling at about 140–170° C. at 0.4 mm. and comprising N-benzyl-1,2,3,4,4a,9a-hexahydro-4a-fluorenamine being collected. A solution of this free base in ether is treated with approximately one equivalent of hydrogen chloride in isopropyl alcohol, and the precipitated hydrochloride is recrystallized from a mixture of methanol and ether; M.P. 186–187° C.

Example 7

To a stirred solution of 19.2 g. of butyllithium in 280 ml. of ether at −70° C. is added a solution of 48.5 g. of N-methyl-2(2′-bromo-4′,5′-methylenedioxybenzyl) cyclohexanimine in 50 ml. of ether. The mixture warms slightly during the addition and is again chilled to −70° C. and stirred at this temperature for an additional 30 minutes. It is then diluted with 200 ml. of ether and allowed to warm to room temperature. The mixture is stirred at room temperature for an additional hour and then decomposed with 250 ml. of water. The organic phase is concentrated to a small volume and extracted with 3-normal hydrochloric acid. The acidic extract is washed with a small volume of ether, chilled and made basic with sodium hydroxide. The liberated organic base is extracted with several portions of ether. This ethereal extract is dried and evaporated and the viscous residue is distilled in a vacuum; the desired N-methyl-6,7-methylenedioxy - 1,2,3,4,4a,9a - hexahydro-4a-fluorenamine is obtained as a distillate boiling at about 124–165° C. at 0.1–0.6 mm. The hydrochloride is prepared by treatment of an ethereal solution of the free base with hydrogen chloride in isopropyl alcohol; M.P. about 174–176° C. after recrystallization from a mixture of methanol and ether. The hydrobromide is prepared by treatment of an ethereal solution of the free base with hydrogen bromide in isopropyl alcohol.

Example 8

To a stirred solution of 19.2 g. of butyllithium in 280 ml. of ether at −70° C is rapidly added a solution of 50.7 g. of N-ethyl-2-(2'-bromo-4',5'-methylenedioxybenzyl) cyclohexanimine in 50 ml. of ether. The mixture is maintained at about —70° C. for 15 minutes following which it is diluted with 250 ml. of ether and warmed to room temperature under a reflux condenser. An exothermic reaction causes the mixture to reflux briefly. It is then stirred for an additional hour at room temperature, chilled and decomposed with 250 ml. of water. The separated organic phase is washed with water, dried, filtered and evaporated to give a residue of N-ethyl - 6,7 - methylenedioxy-1,2,3,4,4a,9a-hexahydro-4a-fluorenamine; B.P. about 162–170° C. at 0.8 mm. by flash distillation. The hydrochloride can be obtained by treating an ethereal solution of the free base with hydrogen chloride in isopropyl alcohol; after recrystallization from a mixture of methanol and ether, it melts at about 168–169° C.

*Example 9*

To a stirred solution of butyllithium prepared from 3 g. of lithium and 21 ml. of butyl bromide in 200 ml. of ether is added at —70° C. a solution of 30.6 g. of N-(3-methoxypropyl) - 2 - (2'-bromo-4',5'-methylenedioxybenzyl) cyclohexanimine in 150 ml. of ether. The temperature rises during the addition and is brought back to —70° C. by efficient external cooling. The mixture is stirred for 15 more minutes, diluted with 200 ml. of ether and allowed to warm to room temperature. Stirring is continued for one more hour and then the mixture is decomposed with 200 ml. of water. The separated organic phase is washed with water, dried and concentrated to yield a residue of N-(3-methoxypropyl)-6,7-methylenedioxy-1,2,3,4,4a,9a-hexahydro-4a-fluorenamine. The hydrochloride is obtained by treating an ethereal solution of the free base with one equivalent of hydrogen chloride in isopropyl alcohol; after recrystallization from a mixture of methanol and ether, it melts at about 161°–163° C.

*Example 10*

To a freshly-prepared solution of 16 g. of butyllithium in 250 ml. of ether, cooled to —65° C., is added a solution of 35.6 g. of N-methyl-2-(o-bromophenoxy) cyclohexanimine in 50 ml. of ether. The temperature is maintained at about —65° C. for 10 minutes following which the mixture is diluted with 300 ml. of ether, allowed to warm to room temperature, maintained at room temperature for 2 hours and then cautiously treated with an excess of water. Efficient stirring is maintained throughout these operations. The separated organic phase is washed with water, and extracted with several portions of dilute hydrochloric acid. The combined aqueous acidic extracts are made basic with sodium hydroxide and the liberated organic free base is removed by extraction with several portions of ether. The ether extract is made anhydrous and evaporated to yield a residue of N - methyl-5a,6,7,8,9,9a-hexahydro-9a-dibenzofuranamine; B.P. about 87–93° C. at 0.15 mm. A solution of this free base in ether is treated with approximately one equivalent of hydrogen chloride in isopropyl alcohol. The precipitated hydrochloride is recrystallized from a mixture of methanol and ether; M.P. about 199–200° C. The hydrobromide is obtained by treating a solution of the free base in ether with hydrogen bromide.

*Example 11*

To a solution of 12.8 g. of butyllithium in 200 ml. of ether at —65° C. is added a solution of 29.6 g. of N-ethyl-2-(o-bromophenoxy)cyclohexanimine in 25 ml. of ether. With continuous stirring, the solution is maintained at about —65° C. for 10 minutes, diluted with 250 ml. of ether, allowed to warm to room temperature, maintained at room temperature for 2 hours and treated cautiously with an excess of water. The ethereal phase is washed with water and concentrated to a small volume. It is then extracted with several portions of dilute hydrochloric acid and the combined aqueous acidic extracts are made basic with sodium hydroxide. The organic base is extracted with ether. The ether extract is dried and evaporated to yield a residue of N-ethyl-5a,6,7,8,9,9a-hexahydro-9a-dibenzofuranamine. A solution of the free base in ether is treated with approximately one equivalent of hydrogen chloride in isopropyl alcohol. The precipitated hydrochloride is recrystallized from a mixture of methanol and ether; M.P. about 184–186° C.

*Example 12*

A solution of 12.8 g. of butyllithium in 200 ml. of ether is chilled to —65° C. and to it is added a solution of 31 g. of N-propyl-2-(o-bromophenoxy)cyclohexanimine in 25 ml. of ether. The reaction mixture is kept at about —65° C. for 10 minutes after which it is diluted with 250 ml. of ether and allowed to warm to room temperature. The mixture is stirred throughout these operations and for an additional two hours at the end of which time it is cautiously treated with an excess of water. The separated ethereal solution is washed with water, concentrated to a small volume and extracted with several portions of dilute hydrochloric acid. The combined aqueous acidic extracts are made basic with sodium hydroxide and the liberated organic base is removed by extraction with several portions of ether. Evaporation of the dried ether extract yields a residue of N-propyl-5a,6,7,8,9,9a-hexahydro-9a-dibenzofuranamine. Addition of 1 equivalent of hydrogen chloride in isopropyl alcohol to a solution of the free base in ether affords the hydrochloride; M.P. 181–182° C. after recrystallization from a mixture of methanol and ether.

*Example 13*

To a stirred solution of 12.8 g. of freshly prepared butyllithium in 200 ml. of ether, chilled to —65° C., is added 25 g. of N-(3-methoxypropyl)-2-(o-bromophenoxy) cyclohexanimine in 25 ml. of ether. Following the addition, the temperature rises to about —45° C. The mixture is again chilled to —65° C., maintained at that temperature for 20 minutes, diluted with 300 ml. of ether and allowed to warm to room temperature. It is stirred at room temperature for an additional two hours and then decomposed by the cautious addition of water. The separated ethereal phase is washed with water and concentrated to a residual oil. A solution of this oil in 50 ml. of fresh ether is extracted with three portions of 3-normal hydrochloric acid. The acidic extract is made distinctly basic with sodium hydroxide and extracted with 3 portions of ether. This ethereal extract is made anhydrous and evaporated to yield a residue of N-(3-methoxypropyl) - 5a,6,7,8,9,9a - hexahydro - 9a - dibenzofuranamine. The hydrochloride is obtained by adding one equivalent of hydrogen chloride in isopropyl alcohol to a solution of the free base in ether. After recrystallization from a mixture of methanol and ether, it melts at about 156–157° C.

*Example 14*

A solution of 5 g. of methyl 1,4,4a,9a-tetrahydro-4a-fluorenecarbamate in 25 ml. of ether is added with stirring to 5 g. of lithium aluminum hydride in 400 ml. of ether at such a rate that the reaction mixture is maintained under moderate reflux. Stirring is then continued for 16 hours after which the mixture is decomposed by the successive addition of 5 ml. of water, 3.75 ml. of 5-normal sodium hydroxide solution and 17.5 ml. of water. The mixture is filtered and a slight excess of hydrogen chloride in isopropyl alcohol is added to the filtrate. The precipitated product is N-methyl-1,4,4a,9a-tetrahydro-4a-fluorenamine hydrochloride; after crystallization from methanol-ether M.P. 201–202° C. The free base is obtained by treating an aqueous solution of the hydrochloride with sodium hydroxide and extracting with ether. A citrate is obtained by adding a solution of citric acid in methanol to a solution of the free base in methanol and concentrating the mixture.

An illustration of one method of preparing the starting material is as follows. A stream of hydrogen chloride gas is passed through a stirred mixture of 100 g. of indene-3-carboxylic acid [now known to be the compound of Journal of the American Chemical Society, 74, 4448–9 (1952)] in 800 ml. of absolute ethanol. The exothermic reaction causes the mixture to reach the reflux point following which it is maintained under reflux for 16 hours and then concentrated to a small volume under reduced pressure. The residue is partitioned between 10% sodium bicarbonate solution and ether and the desired ethyl indene-3-carboxylate is recovered from the ethereal solution; B.P. 102–109° C. at 190 microns. A mixture of 450 g. of this ester, 225 g. of butadiene and a trace amount of t-butylcatechol (as a polymerization inhibitor) is heated in a sealed reaction vessel at 180° C. for 15 hours. After removal of low boiling materials under reduced pressure the principal product, ethyl 1,4,4a,9a-tetrahydro-4a-fluorenecarboxylate is flash distilled to remove it from polymeric byproducts. Upon refractionation this compound boils at 95–105° C. at 75–100 microns. A mixture of 200 g. of this product, 185 g. of potassium hydroxide, and 900 ml. of diethylene glycol is heated under reflux for 1½ hours. The reaction mixture is cooled and poured into ice water which is then acidified with hydrochloric acid. The insoluble 1,4,4a,9a-tetrahydro-4a-fluorenecarboxylic acid which gradually crystallizes is collected on a filter; after recrystallization from anhydrous benzene-isooctane, M.P. 118.5–119° C. A solution of 55 g. of this acid in 21.8 ml. of thionyl chloride and 250 ml. of benzene is heated under reflux for 2 hours and then cooled and added dropwise to 500 ml. of stirred concentrated aqueous ammonia at 5–7° C. Stirring in the cold is continued for another hour and the benzene solution which contains the desired product is separated and washed rapidly with 1-normal sodium hydroxide solution and with water. Additional benzene is added if the desired product crystallizes during the reaction. The benzene solution is dried and distilled to yield 1,4,4a,9a-tetrahydro-4a-fluorenecarboxamide; M.P. 77.5–78° C. after recrystallization from isooctane. 20.5 g. of this amide is added to a freshly prepared solution of 11.5 g. of sodium in 400 ml. of methanol protected from atmospheric moisture. The solution is chilled to −20° C. and maintained at this temperature while 19.2 g. of bromine is added dropwise. The mixture is then allowed to warm to room temperature and finally heated under reflux for 1½ hours. It is then cooled, neutralized with 17.1 ml. of acetic acid, and distilled in a vacuum to remove the solvent. The residue is dissolved in ether and the ethereal solution is washed with water, dried, and distilled to leave a residue of methyl 1,4,4a,9a-tetrahydro-4a-fluorenecarbamate which upon distillation boils at 138–145° C. at 190 microns.

The 1,4,4a,9a-tetrahydro-4a-fluorenecarboxylic acid used in the production of starting material can also be made by reacting indene-3-carboxylic acid with butadiene. For example, 52 g. of indene-3-carboxylic acid, 34 ml. of butadiene, and 50 ml. of toluene containing a trace amount of t-butylcatechol is heated in a sealed reaction vessel for 24 hours at 120° C. The product which crystallizes when the mixture is cooled is collected by filtration and extracted with several portions of hot isooctane. Cooling of the combined isooctane solution yields 1,4,4a,9a-tetrahydro-4a-fluorenecarboxylic acid. An additional quantity of this product can be obtained from the toluene liquors.

*Example 15*

A solution of 7 g. of methyl 1,2,3,4,4a,9a-hexahydro-4a-fluorenecarbamate in 15 ml. of ether is slowly added with stirring to 7 g. of lithium aluminum hydride in 500 ml. of ether. Stirring is continued for 16 more hours and then the mixture is decomposed by the successive addition of 7 ml. of water, 5.3 ml. of 5-normal sodium hydroxide solution and 24.5 ml. of water. The mixture is filtered and a slight excess of hydrogen chloride in isopropyl alcohol is added to the filtrate. The precipitated product is N-methyl-1,2,3,4,4a,9a-hexahydro-4a-fluorenamine hydrochloride; M.P. 202–203° C. after recrystallization from methanol-ether. The free base is obtained by treating an aqueous solution of the hydrochloride with sodium hydroxide and extracting with ether. The hydrobromide is obtained by adding a slight excess of hydrogen bromide to a solution of the free base in ether.

An illustration of one method of preparing the starting material is as follows. 15 g. of ethyl 1,4,4a,9a-tetrahydro-4a-fluorenecarboxylate in 100 ml. of ethanol is hydrogenated by shaking it with 0.5 g. of 20% palladium on charcoal catalyst in the presence of a hydrogen atmosphere. At the end of about 30 minutes, or when the theoretical amount of hydrogen has been absorbed, the solvent is removed under reduced pressure and the residue of ethyl 1,2,3,4,4a,9a-hexahydro-4a-fluorenecarboxylate is hydrolyzed by heating it under reflux for one hour with 14 g. of potassium hydroxide in 95 ml. of diethylene glycol. The mixture is cooled, poured into ice water, and acidified with 25 ml. of concentrated hydrochloric acid to yield a precipitate of 1,2,3,4,4a,9a-hexahydro-4a-fluorenecarboxyl acid which is collected and washed with water; M.P. 117–118° C. after recrystallization from benzene-petroleum ether. A solution of 7.5 of this acid in 50 ml. of thionyl chloride is heated under reflux for one hour and distilled almost to dryness in a vacuum. The residue is cooled and added dropwise with stirring to 150 ml. of concentrated aqueous ammonia at 0° C. The 1,2,3,4,4a,9a-hexahydro-4a-fluorenecarboxamide which precipitates is collected on a filter and washed with water; M.P. 101–103° C. following recrystallization from benzene-petroleum ether. 2.2 g. of this amide is added at 5–7° C. to a freshly prepared solution of 1.2 g. of sodium in 50 ml. of methanol protected from atmospheric moisture. While maintaining the temperature below 15° C., 2.0 g. of bromine is gradually added. The mixture is heated under reflux for 1½ hours, cooled, neutralized with about 3 ml. of acetic acid and distilled in a vacuum to remove the solvent. The residue is dissolved in ether and the ether phase is washed with water, dried and distilled to yield a residue of methyl 1,2,3,4,4a,9a-hexahydro-4a-fluorenecarbamate; M.P. about 55° C.

*Example 16*

A mixture of 5.5 g. of methyl 1,4,4a,9a-tetrahydro-4a-fluorenecarbamate and 6.2 g. of potassium hydroxide in 50 ml. of diethylene glycol containing at least about 1% water is heated under reflux for 16 hours and then poured into ice water. The aqueous mixture is extracted with 2 portions of ether. The combined ethereal extract is dried over magnesium sulfate and evaporated to give a residue of 1,4,4a,9a-tetrahydro-4a-fluorenamine. The hydrochloride is obtained by adding a slight excess of hydrogen chloride in isopropyl alcohol to a solution of the free base in ether; M.P. 227–229° C. after crystallization from methanol-ether. The hydrobromide is obtained by adding a slight excess of hydrogen bromide to a solution of the free base in ether.

*Example 17*

A mixture of 2.45 g. of methyl 1,2,3,4,4a,9a-hexahydro-4a-fluorenecarbamate and 3.0 g. of potassium hydroxide in 25 ml. of diethylene glycol containing at least about 1% water is heated under reflux for 18 hours and then poured into ice water. The mixture is extracted with several portions of ether and the ether solution is dried and evaporated to give a residue of 1,2,3,4,4a,9a-hexahydro-4a-fluorenamine. The hydrochloride is obtained by dissolving the free base in ether and adding a slight excess of hydrogen chloride; M.P. 256–257° C. after recrystallization from methanol-ether.

Example 18

A solution of 1.05 g. of N-benzyl-1,2,3,4,4a,9a-hexahydro-4a-fluorenamine hydrochloride in 75 ml. of methanol containing 0.3 g. of 20% palladium on carbon catalyst is shaken in contact with a hydrogen atmosphere, initially at a pressure of 54 pounds per square inch. After the absorption of hydrogen substantially ceases, the catalyst is removed by filtration and the filtrate is concentrated to dryness. The residue of 1,2,3,4,4a-9a-hexahydro-4a-fluorenamine hydrochloride is crystallized by the addition of ether. Subsequent crystallizations from mixtures of methanol and ether afford the purified product, M.P. about 256–257° C. The free base is obtained by treating an aqueous solution of the hydrochloride with sodium hydroxide and extracting with ether. The free base is converted to the hydrobromide by treating it in ether solution with 1 equivalent of hydrogen bromide. If desired the hydrogenation can also be carried out on N-benzyl-1,2,3,4,4a,9a-hexahydro-4a-fluorenamine.

Example 19

To 6.0 g. of N-methyl-1,2,3,4,4a,9a-hexahydro-4a-fluorenamine is added 3.04 g. of 98% formic acid and then 2.56 g. of 37% formaldehyde. The mixture is heated at 90–100° C. for 5 hours and allowed to stand at room temperature for 16 hours. It is then made basic with 5-normal sodium hydroxide solution and the liberated free base is removed by extraction with several portions of ether. The combined ethereal extract is dried and evaporated and the residue is distilled under high vacuum. The desired N,N-dimethyl-1,2,3,4,4a,9a-hexahydro-4a-fluorenamine is obtained as a fraction boiling at about 90–96° C. at 0.15 mm. The hydrochloride is prepared by treating an ethereal solution of the free base with a slight excess of hydrogen chloride in isopropyl alcohol. After crystallizing the product from a mixture of dioxane and ether, it melts at about 158–160° C. When methanolic solutions of the free base and maleic acid are mixed and concentrated, the product is a water-soluble maleate.

Example 20

To 8.0 g. of 1,4,4a,9a-tetrahydro-4a-fluorenamine are added in succession 8.3 g. of formic acid and 7.3 g. of 37% formaldehyde. The mixture, which evolves carbon dioxide, is heated at 90–100° C. for 4 hours. 70 ml. of 5-normal sodium hydroxide is added and the amine which separates is extracted with 3 portions of ether. The combined ethereal extract is dried and evaporated to give a residue of N,N-dimethyl-1,4,4a,9a-tetrahydro-4a-fluorenamine. The hydrochloride is obtained by treating an ethereal solution of the free base with a slight excess of hydrogen chloride and separating the crystalline product which forms; M.P. 176–177° C. after crystallization from a mixture of ethanol and ether.

Example 21

Acetic anhydride (5.3 g.) is added in small portions to a solution of 8.0 g. of 1,4,4a,9a-tetrahydro-4a-fluorenamine in 50 ml. of methylene dichloride at 10–20° C. The mixture is allowed to stand at room temperature for 5 hours and is then washed with 43 ml. of 1-normal hydrochloric acid and with saturated sodium bicarbonate solution. The methylene dichloride solution is then dried and distilled under reduced pressure to yield a residue of N-acetyl-1,4,4a,9a-tetrahydro-4a-fluorenamine; a sample recrystallized from benzene melts at about 144–145° C. but purification is not necessary for the next operation. The N-acetyl-1,4,4a,9a-tetrahydro-4a-fluorenamine is introduced by continuous extraction into a stirred refluxing mixture of 8 g. of lithium aluminum hydride and 600 ml. of anhydrous ether. Stirring is continued at room temperature for 16 hours and the mixture is then decomposed by the successive addition of 8 ml. of water, 6 ml. of 5-normal sodium hydroxide and 28 ml. of water. The mixture is filtered and a slight excess of hydrogen chloride in isopropyl alcohol is added to the filtrate. The product obtained is N-ethyl-1,4,4a,9a-tetrahydro-4a-fluorenamine hydrochloride; M.P. 204–206° C. after crystallization from methanol-ether. The free base is obtained by treating an aqueous solution of the hydrochloride with sodium hydroxide and extracting with ether. The water soluble hydrobromide is obtained by treating a solution of the free base in anhydrous ether with a slight excess of hydrogen bromide.

By the foregoing procedure, with the substitution of an equivalent amount of 1,2,3,4,4a,9a-hexahydro-4a-fluorenamine for the 1,4,4a,9a-tetrahydro-4a-fluorenamine, the products obtained are N-ethyl-1,2,3,4,4a,9a-hexahydro-4a-fluorenamine and its acid-addition salts; the hydrochloride melts at about 198–199° C.

Example 22

Propionic anhydride (6.7 ml.) is added to a solution of 8 g. of 1,4,4a,9a-tetrahydro-4a-fluorenamine in 50 ml. of methylene dichloride at 10–15° C. The reaction mixture is allowed to stand at room temperature for 16 hours. It is then washed with 43 ml. of 1-normal hydrochloric acid and with saturated sodium bicarbonate solution, filtered, dried, and concentrated to a small volume under reduced pressure. The N-propionyl-1,4,4a,9a-tetrahydro-4a-fluorenamine which separates is used in the next step without purification; a small sample recrystallized from benzene-isooctane melts at about 98–100° C. The N-propionyl-1,4,4a,9a-tetrahydro-4a-fluorenamine is introduced by continuous extraction into a stirred, refluxing mixture of 8 g. of lithium aluminum hydride in 600 ml. of ether. After all of the reactant has been added stirring is continued at room temperature for an additional 12 hours. The reaction mixture is then decomposed by the successive addition of 8 ml. of water, 6 ml. of 5-normal sodium hydroxide solution and 28 ml. of water. The mixture is filtered and hydrogen chloride is added to the filtrate to precipitate crystalline N-propyl-1,4,4a,9a-tetrahydro-4a-fluorenamine hydrochloride; M.P. 237–238° C. after crystallization from methanol-ether. The free base is obtained by treating an aqueous solution of the hydrochloride with potassium carbonate and extracting with ether.

Example 23

A reaction mixture prepared from 8.5 g. of N-methyl-5a,6,7,8,9,9a-hexahydro-9a-dibenzofuranamine, 50 ml. of methylene dichloride and 4.8 g. of acetic anhydride is allowed to stand at room temperature for 18 hours. The mixture is washed with one equivalent of 3-normal hydrochloric acid, then with dilute sodium bicarbonate solution until slightly basic. The dried methylene dichloride phase is evaporated to yield a residue of N-acetyl-N-methyl-5a,6,7,8,9,9a-hexahydro-9a-dibenzofuranamine. A solution of this residue in 30 ml. of anhydrous ether is gradually added to a stirred solution of 5 g. of lithium aluminum hydride in 400 ml. of anhydrous ether. The mixture is stirred for 18 hours and then decomposed by the successive addition of 5 ml. of water, 3.75 ml. of 20% sodium hydroxide solution and 7.5 ml. of water. The mixture is filtered and a slight excess of hydrogen chloride in isopropyl alcohol is added to the filtrate. The precipitated N-ethyl-N-methyl- 5a,6,7,8,9,9a-hexahydro-9a-dibenzofuranamine hydrochloride is recrystallized from a mixture of methanol and ether; M.P. about 138–139° C. The free base is obtained by treating an aqueous solution of the hydrochloride with sodium hydroxide and extracting with ether. A citrate is obtained by adding a solution of citric acid in methanol to a solution of the free base in methanol and concentrating.

Example 24

A solution of 5 g. of N-methyl-1,4,4a,9a-tetrahydro-4a-fluorenamine hydrochloride in 100 ml. of methanol is hydrogenated by shaking it with 0.5 g. of 20% palladium on charcoal catalyst in contact with a hydrogen atmosphere. When the theoretical amount of hydrogen corresponding to hydrogenation of one double bond has been absorbed, the catalyst is removed by filtration and the solvent distilled under reduced pressure to yield N-methyl-1,2,3,4,4a,9a-hexahydro-4a-fluorenamine hydrochloride; M.P. 202–203° C. following recrystallization from methanol-ether. The free base is obtained by treating an aqueous solution of the hydrochloride with sodium hydroxide and extracting with ether. The hydrobromide is obtained by adding a slight excess of hydrogen bromide to a solution of the free base in ether. If desired, the hydrogenation can also be carried out on N-methyl-1,4,4a,9a-tetrahydro-4a-fluorenamine.

STARTING MATERIALS

N - substituted-2-(o-halobenzyl)cyclohexanimines and N-substituted-2-(o-halophenoxy)cyclohexanimines used as starting materials in the practice of the invention can be obtained by the reaction of a primary amine such as a lower alkyl amine, a lower alkoxyalkyl amine or benzylamine with a 2-(o-halobenzyl)cyclohexanone or a 2-(o-halophenoxy)-cyclohexanone. The following are specific examples showing the application of this method.

A solution of 200 ml. of anhydrous benzene, 26.7 g. of 2-(o-bromobenzyl)cyclohexanone, 11 g. of 3-methoxypropylamine and a small quantity of benzenesulfonic acid is heated under reflux with continuous removal of the water formed in the reaction. After approximately the theoretical amount of water has been collected (2–3 hours) the solvent is removed by distillation under reduced pressure and the residue is subjected to infrared absorption analysis. The presence of a strong absorption band at about 6.07 microns with no more than slight residual absorption at about 5.8 microns indicates that the N - (3-methoxypropyl)-2-(o-bromobenzyl)cyclohexanimine is suitable for use in the practice of the invention. If more than slight residual absorption is observed in the 5.8 micron range, the reaction is brought to completion by redissolving the crude product in benzene, adding a fresh portion of 5 g. of 3-methoxypropylamine and again heating under reflux with removal of the water as formed.

In the case of the more volatile amines, the reaction is carried out either by heating the mixture in a closed vessel or by conducting the reaction at a lower temperature. To 35 ml. of anhydrous liquid methylamine is added in portions a total of 25 g. of 2-(o-bromophenoxy)cyclohexanone. A catalytic amount of benzenesulfonic acid is added and the mixture is heated in a closed vessel capable of withstanding pressure for 10 hours at 80° C. The mixture is cooled and the excess methylamine is removed by evaporation. To the residual oil is added 150 ml. of anhydrous ether resulting in the separation of 1.8 ml. of water as a second phase. The ethereal solution is dried over magnesium sulfate and concentrated under reduced pressure to yield an oily residue of N-methyl-2-(o-bromophenoxy)cyclohexanimine. The completion of the reaction is determined by infrared absorption analysis.

If desired, calcium hydride can be used as a water acceptor. A mixture of 47 g. of 2-(2'-bromo-4',5'-methylenedioxybenzyl)cyclohexanone, 9 g. of calcium hydride, 7 g. of methylamine and 300 ml. of benzene is stirred for 3 hours at about 0° C. and then allowed to stand for 18 hours. Hydrogen is evolved from the mixture as the water formed reacts with the calcium hydride. Upon filtration of the mixture and evaporation of the solvent, the residue is found by infrared absorption analysis to consist of the desired imine mixed with a substantial amount of unreacted ketone. When this crude product is stirred with fresh portions of calcium hydride and methylamine in benzene at room temperature, the product obtained is N-methyl-2-(2'-bromo-4',5'-methylenedioxybenzyl)cyclohexanimine showing an infrared absorption spectrum substantially free of carbonyl absorption.

The following are specific examples of the preparation of representative halo ketones from which there can be derived the imines used as starting materials in the practice of the invention.

A suspension of 75 g. of 50% sodamide dispersion in xylene and 1440 ml. of reagent grade benzene is brought to reflux and treated with a solution of 154 g. of o-bromobenzyl chloride and 98 g. of cyclohexanone, added at a rate sufficient to maintain slow reflux. Upon completion of the addition, the reaction mixture is heated under reflux for another 6 hours and then allowed to stand overnight. Water (500 ml.) is cautiously added and after thorough mixing the organic layer is separated, washed with 2 portions of water and dried over magnesium sulfate. Upon removal of the solvent, there is obtained a residue of 2-(o-bromobenzyl)-cyclohexanone. This product can be purified by flash distillation followed by refractionation through a distillation column; B.P. 108–112° C. at 0.07 mm.; B.P. 146–150° C. at 0.65 mm.

To a mixture of 80 g. of sodium methoxide in 300 ml. of absolute methanol is added 211 g. of o-bromophenol. Excess methanol is removed by distillation under reduced pressure followed by prolonged evacuation by means of an oil pump. To the residue in 1500 ml. of anhydrous ether is added dropwise with stirring 160 g. of 2-chlorocyclohexanone. The reaction mixture is stirred for an additional hour after which the inorganic salts are dissolved by the addition of 500 ml. of water. The separated ethereal phase is washed with dilute sodium hydroxide solution, with 10% acetic acid and with water. It is dried over magnesium sulfate and concentrated under reduced pressure to a volume of about 500–700 ml. The mixture is chilled and filtered in order to collect the crystalline 2-(o-bromophenoxy)cyclohexanone which melts at about 103–105° C. and is suitable for use without further purification. A more highly purified sample melts at 105–106° C.

A suspension of 16 g. of 50% sodamide dispersion in xylene and 200 ml. of reagent grade benzene is brought to reflux and treated with a solution of 37 g. of 2-bromo-4,5-methylenedioxybenzyl bromide and 17 ml. of cyclohexanone in 75 ml. of benzene, added in small portions at a rate sufficient to maintain slow reflux. The mixture is then heated under reflux for an additional 2 hours, cooled and cautiously decomposed with water. The separated organic phase is washed with water, dried and concentrated under reduced pressure. When the residue is distilled in a vacuum, 2-(2'-bromo-4',5'-methylenedioxybenzyl)cyclohexanone is obtained as a fraction boiling at about 165–171° C. at 0.15 to 0.19 mm. This fraction is crystallized by the addition of petroleum ether; after recrystallization from ethanol, the product melts at about 84–85° C.

I claim:

1. A member of the class consisting of free bases of the structural formula

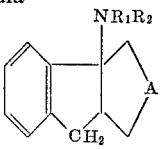

and non-toxic acid-addition salts thereof with pharmaceutically-acceptable acid; where $R_1$ is a member of the class consisting of hydrogen, lower alkyl radicals, lower alkoxyalkyl radicals, and the benzyl radical; $R_2$ is a member of the class consisting of hydrogen and lower alkyl radicals; and A is a member of the class consisting of the ethylene radical and the vinylene radical.

2. A compound of the structural formula

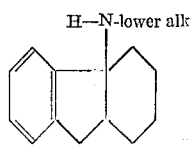

3. N-methyl-1,2,3,4,4a,9a-hexahydro-4a-fluorenamine.
4. Non-toxic acid-addition salts of N-(lower alkyl)-1,2,3,4,4a,9a-hexahydro-4a-fluorenamine with pharmaceutically-acceptable acids.
5. N-methyl-1,2,3,4,4a,9a-hexahydro-4a-fluorenamine hydrochloride.
6. A compound of the structural formula

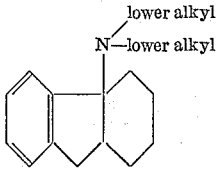

7. N,N-dimethyl-1,2,3,4,4a,9a-hexahydro-4a-fluorenamine.
8. Non-toxic acid-addition salts of N,N-di(lower alkyl)-1,2,3,4,4a,9a-hexadrydro-4a-fluorenamine with pharmaceutically-acceptable acids.
9. N,N-dimethyl-1,2,3,4,4a,9a-hexahydro-4a-fluorenamine hydrochloride.
10. A compound of the structural formula

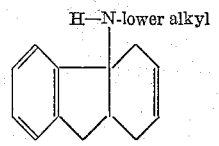

11. N-methyl-1,4,4a,9a-tetrahydro-4a-fluorenamine.
12. Non-toxic acid-addition salts of N-(lower alkyl)-1,4,4a,9a-tetrahydro-4a-fluorenamine with pharmaceutically-acceptable acids.
13. N-methyl-1,4,4a,9a-tetrahydro-4a-fluorenamine hydrochloride.
14. Process for the production of a compound having a free base form the formula

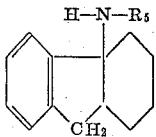

which comprises a first step, according to which an imine of the formula

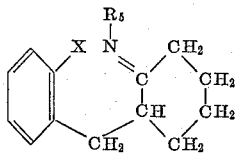

is reacted with butyllithium in an anhydrous ether solvent at a temperature below 0° C., whereby replacement of halogen by lithium occurs; a second step, according to which the reaction mixture is warmed to a temperature above 0° C., and kept at said temperature until ring closure is substantially complete; and a third step, according to which the product resulting from ring closure is hydrolyzed by the addition of water to the reaction mixture; where $R_5$ is a member of the class consisting of lower alkyl, lower alkoxyalkyl, and benzyl; and X is a halogen atom.

References Cited in the file of this patent

Nakamura: "Chem. Abs.," vol. 24, page 1637 (1930).